(12) United States Patent
Nishizawa

(10) Patent No.: US 7,671,249 B2
(45) Date of Patent: Mar. 2, 2010

(54) OPERATION INPUT DEVICE, TELECONTROL SYSTEM AND TELECONTROL METHOD

(75) Inventor: Kouji Nishizawa, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 1146 days.

(21) Appl. No.: 10/774,533

(22) Filed: Feb. 10, 2004

(65) Prior Publication Data

US 2005/0075739 A1  Apr. 7, 2005

(30) Foreign Application Priority Data

Oct. 2, 2003  (JP)  ............................. 2003-344422

(51) Int. Cl.
*A61F 13/15* (2006.01)
*H04L 12/28* (2006.01)
*H04J 3/06* (2006.01)
*G05D 16/00* (2006.01)

(52) U.S. Cl. ........................ 604/361; 370/426; 370/350; 700/301

(58) Field of Classification Search ............ 370/426.11, 370/350; 505/123–126, 778, 779; 340/428, 340/825.69, 825.29; 606/1, 15, 167, 205, 606/207, 129, 130; 600/118, 101, 102; 700/345, 700/301–305; 604/361
See application file for complete search history.

(56) References Cited

U.S. PATENT DOCUMENTS

| 5,876,325 | A | * | 3/1999 | Mizuno et al. | ............... 600/102 |
| 5,898,599 | A | | 4/1999 | Massie et al. | ............... 364/578 |
| 6,120,433 | A | * | 9/2000 | Mizuno et al. | ............... 600/102 |
| 6,301,526 | B1 | | 10/2001 | Kim et al. | .................. 700/260 |

FOREIGN PATENT DOCUMENTS

| JP | 2-19489 | 2/1990 |
| JP | 04-129682 | 4/1992 |

* cited by examiner

*Primary Examiner*—Jacqueline F. Stephens
(74) *Attorney, Agent, or Firm*—Antonelli, Terry, Stout & Kraus, LLP.

(57) ABSTRACT

In the operation input device of the prior art, the input of a position and the input of an attitude are mixed up and both the position and attitude may be changed by the result of the input of a change in attitude. Therefore, the intention of an operator cannot be reflected accurately.

To solve the above problem, an operation input device of the present invention has a first movement detection unit for detecting the position and attitude of a first operation input unit and a second movement detection unit, connected to the first movement detection unit, for detecting the position and attitude of a second operation input unit to separate a part for inputting a position from a part for inputting an attitude.

15 Claims, 11 Drawing Sheets

OPERATION INPUT DEVICE, TELECONTROL SYSTEM AND TELECONTROL METHOD

FIELD OF THE INVENTION

The present invention relates to an operation input device for allowing an operator to input an operation instruction to be transmitted to an object to be controlled and to a telecontrol system and telecontrol method for moving the object based on the input of the operation.

BACKGROUND OF THE INVENTION

When the object to be controlled has six degrees of freedom, an operation input device of the prior art for inputting a moving instruction to the object is provided with the same six degrees of freedom as the object. As proposed in patent document 1, for example, there is a device for detecting the movement of a finger with six degrees of freedom by a structure in which a link mechanism having six degrees of freedom is provided with a part for placing a finger. An operation intended by an operator is input by fixing a finger at a predetermined position or holding a control unit.

Patent document 2 proposes a structure for instructing an operation to an object to be controlled with a whole arm by attaching a link mechanism to a human body.

[Patent document 1] U.S. Pat. No. 5,898,599

[Patent document 2] U.S. Pat. No. 6,301,526.

Supposing the telecontrol of a robot, for example, a simple task or a repetition of the same task can be performed by a robot autonomously. Therefore, for an accurate task, task which needs human intention or decision, or delicate task rather than the above task, an operator needs to telecontrol a robot. Particularly when a manipulator used in the medical field is to be remotely controlled, it is important that the operating tool fine control technique of an operating surgeon who is an operator should be realized accurately.

However, in an operation input device of the prior art, the input of a position and the input of an attitude are mixed up and the position and the attitude may be both changed by an input operation which is supposed to be made to change the attitude. Thus, the operation input device cannot reflect the intention of an operator accurately.

In general, when an attitude is input with a finger, the position of the finger is also changed by the movement of the finger in addition to a change in attitude. It is difficult for a man to change only the attitude or only the position. Unintentionally, he/she inputs an operation for changing both the position and attitude.

Particularly when the operator is not an expert, it has been difficult for him/her to control the operation input device as he/she intends. Since it is considered that it is a general surgeon who uses the operation input device especially in the medical field, technology for accurately reflecting the intention of an operator is important for the operation input device.

In the mechanism as disclosed in patent document 1, when an operator wants to change only the attitude of an object to be controlled while the position of the object is fixed or when the operator wants to change only the position of the object while the attitude of the object is fixed, the operator must carry out the input of an operation for changing only the attitude of the object while the position of his/her finger or the control unit is fixed or an operation for changing the position of the object while the attitude of the object is fixed. This kind of operation is difficult to be made. In fact, a movement is input into a parameter which should not be changed.

In the mechanism as disclosed by patent document 2, although the number of degrees of freedom is large, the separation of position and attitude is not taken into consideration.

SUMMARY OF THE INVENTION

It is therefore an object of the present invention to provide an operation input device which is capable of instructing an operation by easily separating an attitude instruction from a position instruction as well as a telecontrol system and a telecontrol method.

The operation input device for allowing an operator to input a moving instruction to an object to be controlled of the present invention comprises a first movement detection unit for detecting the position and attitude of a first operation input unit and a second movement detection unit, connected to the first movement detection unit, for detecting the position and attitude of a second operation input unit.

The telecontrol system of the present invention is provided with a control device for controlling the object to be controlled based on position and attitude information to be instructed to the object, which is prepared from information on the position of the first operation input unit and information on the attitude of the second operation input unit of the above operation input device.

The telecontrol method of the present invention comprises preparing position and attitude information to be instructed to the object to be controlled from information on the position of the first operation input unit and information on the attitude of the second operation input unit of the above operation input device and controlling the object based on the position and attitude information.

In the present invention, the position and attitude of the wrist are detected by the first movement detection unit and the position and attitude of a finger are detected by the second movement detection unit to separate the detection of position control from the detection of attitude control mechanically, thereby making it possible to solve the problem of the prior art device that the input of a position and the input of an attitude are mixed up and to detect operation information which reflects the intention of an operator by a more precise, easier and more intuitive operation method.

Since position control can be separated from attitude control, the input of an operation which must be accurate and fine becomes easily possible. When a telecontrolled manipulator which is used in the medical scene is to be operated, a delicate operation intended by a surgeon can be transmitted to the manipulator precisely with the result that remedy with the manipulator and safety can be improved.

DETAILED DESCRIPTION OF THE PREFERRED EMBODIMENTS

First Embodiment

Figure 1:
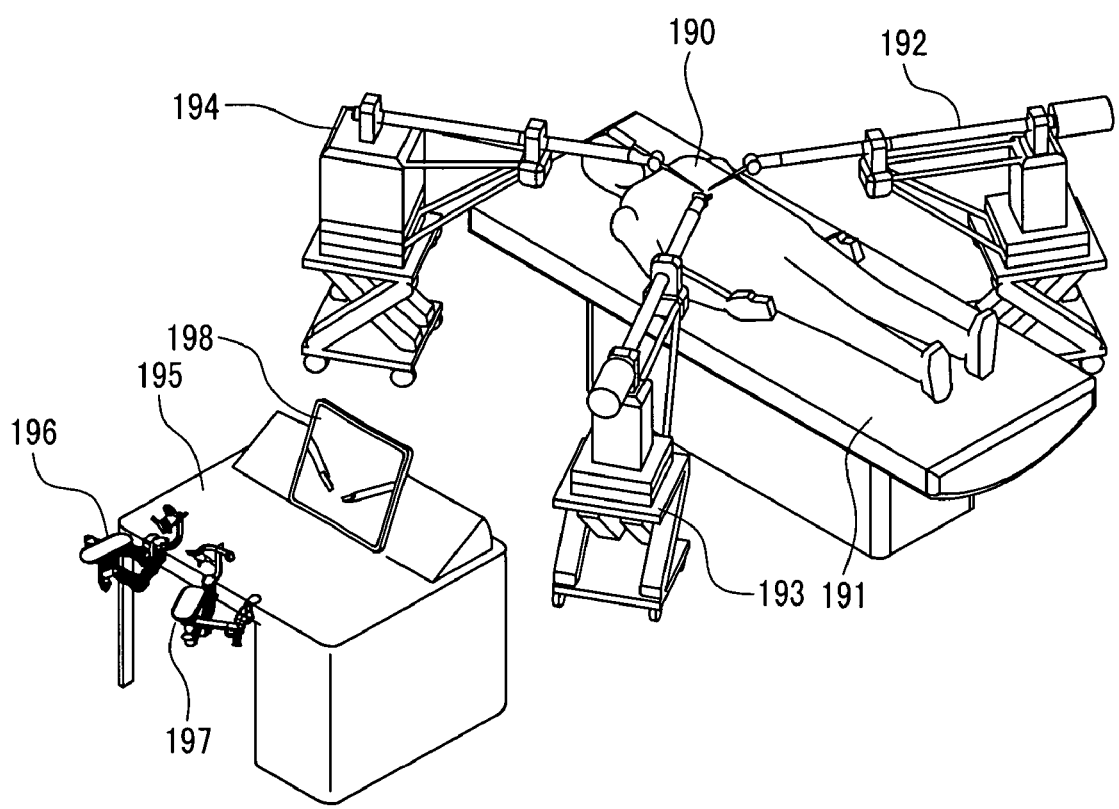
FIG. 1 is a system structural diagram.

A description is first given of the whole system according to an embodiment of the present invention with reference to FIG. 1. FIG. 1 illustrates a system for treating a patient in which the object to be controlled is an operating manipulator connected to an operation input device by master-slave control so that a surgeon uses the operation input device to control the operating manipulator.

A patient 190 is laid down on an operating table 191. The body of the patient is cut open for an operation, the distal ends of an endoscope manipulator 194 and two operating tool manipulators 192 and 193 are inserted into the body of the patient from the cut part. Forceps at the ends of the inserted operating tool manipulators are photographed by the camera of the endoscope manipulator 194 and displayed on a monitor 198 installed on a control desk 195. Operation input devices 196 and 197 are placed on the control desk 195. The operation input device 196 is connected to the operating tool manipulator 192 which is displayed on the left part of the monitor 198, and the contents of an input operation are transmitted to the operating tool manipulator 192 through a control device. The operation input device 197 is connected to the operating tool manipulator 193 which is displayed on the right part of the monitor 198, and the contents of an input operation are transmitted to the operating tool manipulator 193 through the control device.

Figure 2:
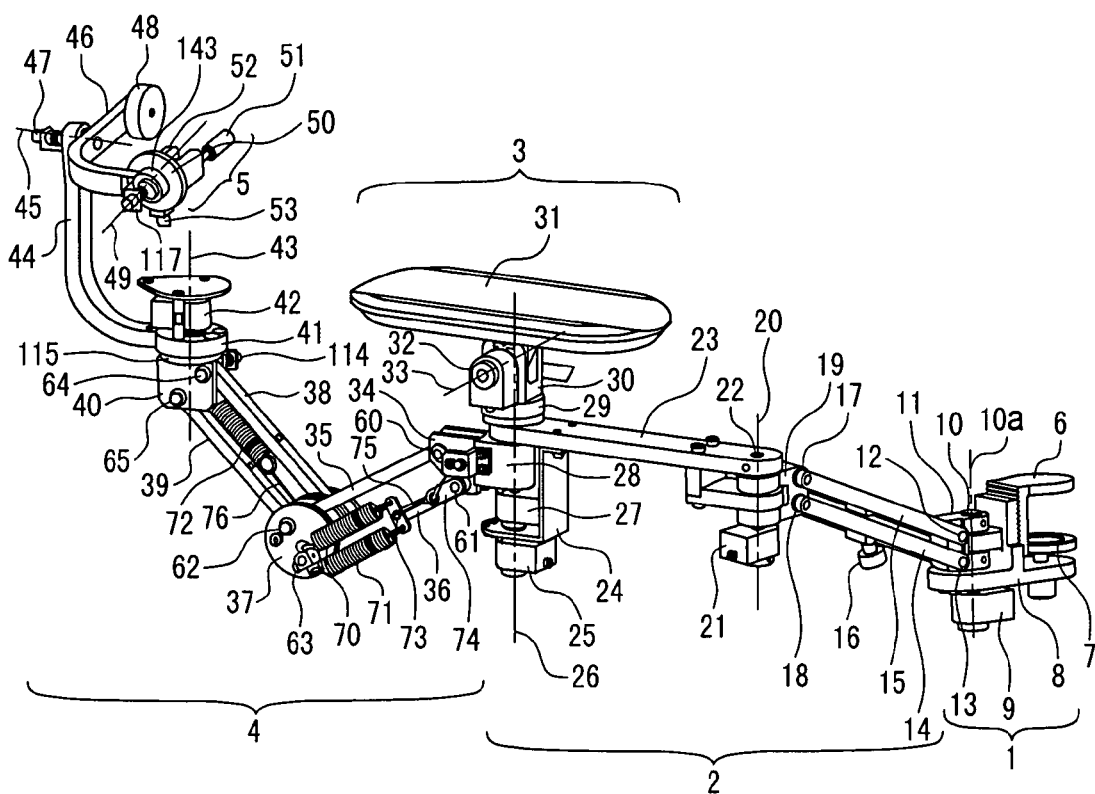
FIG. 2 is a perspective view of an operation input device.
Figure 4:
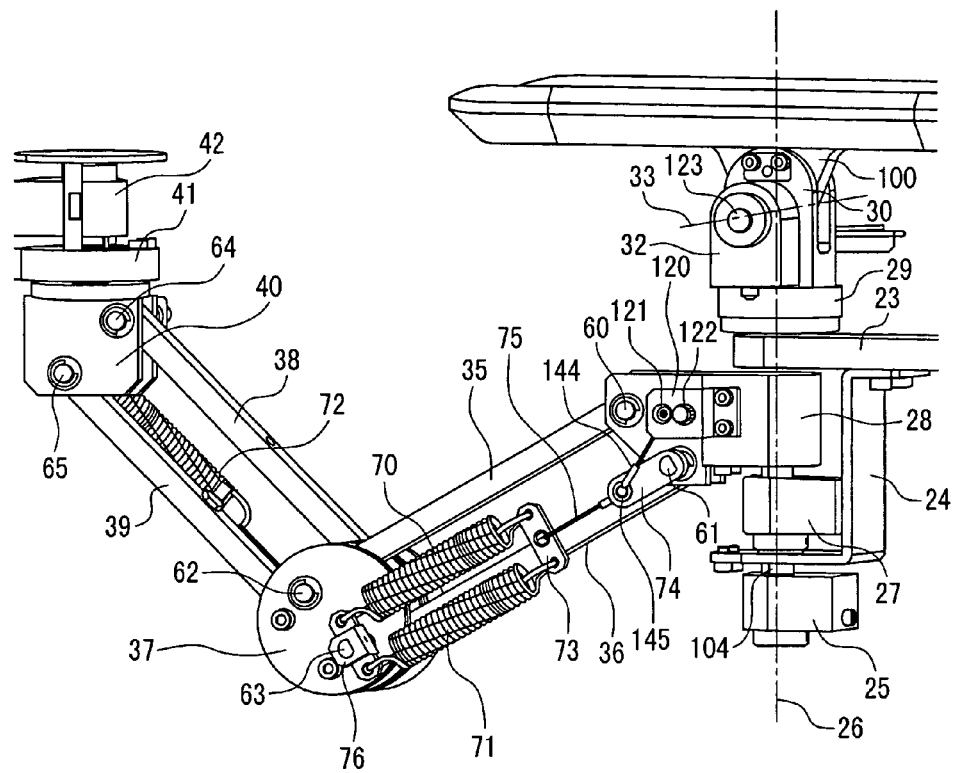
FIG. 4 is an enlarged perspective view of the mechanism.
Figure 5:
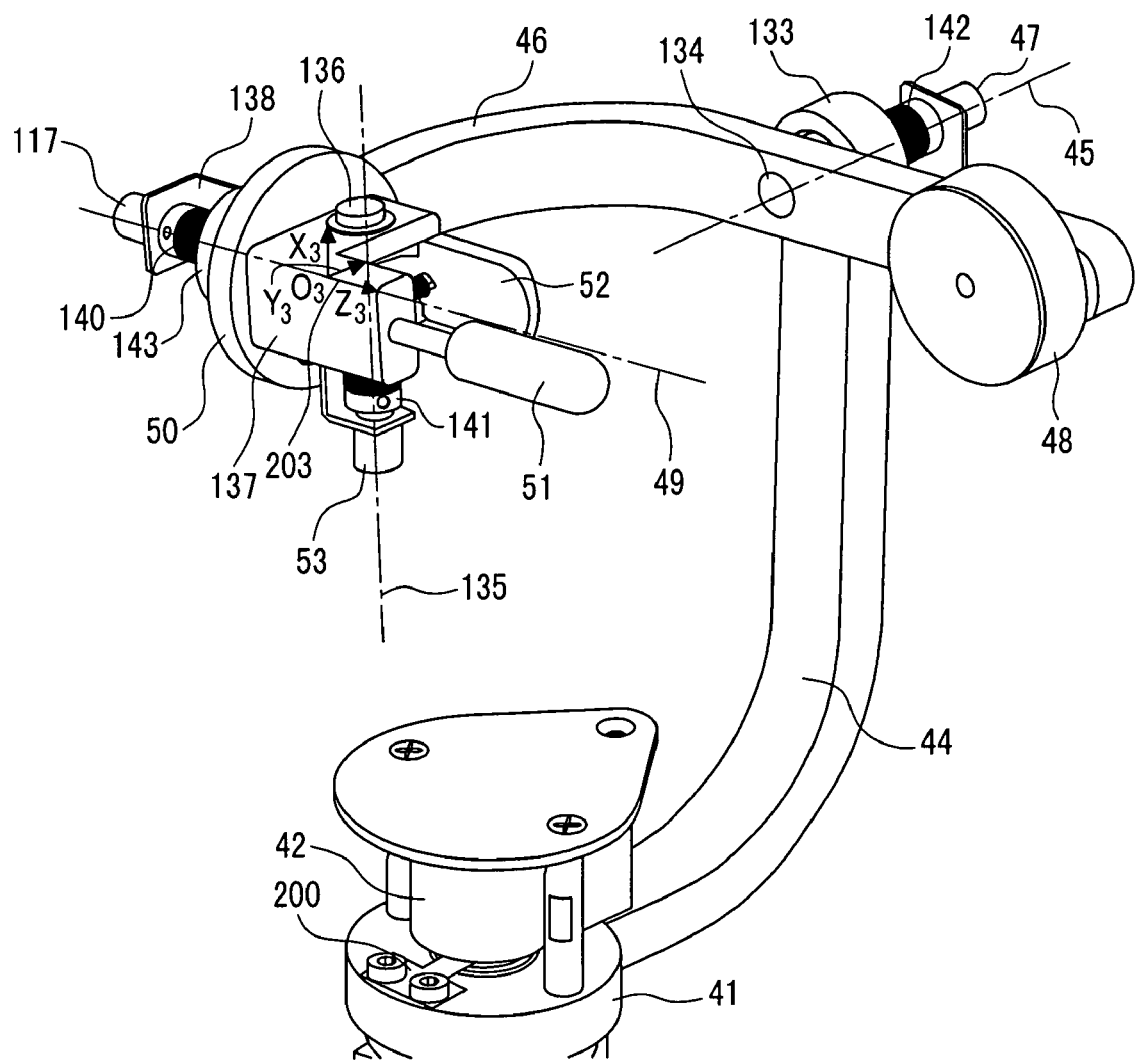
FIG. 5 is an enlarged perspective view of a holding mechanism.
Figure 6:
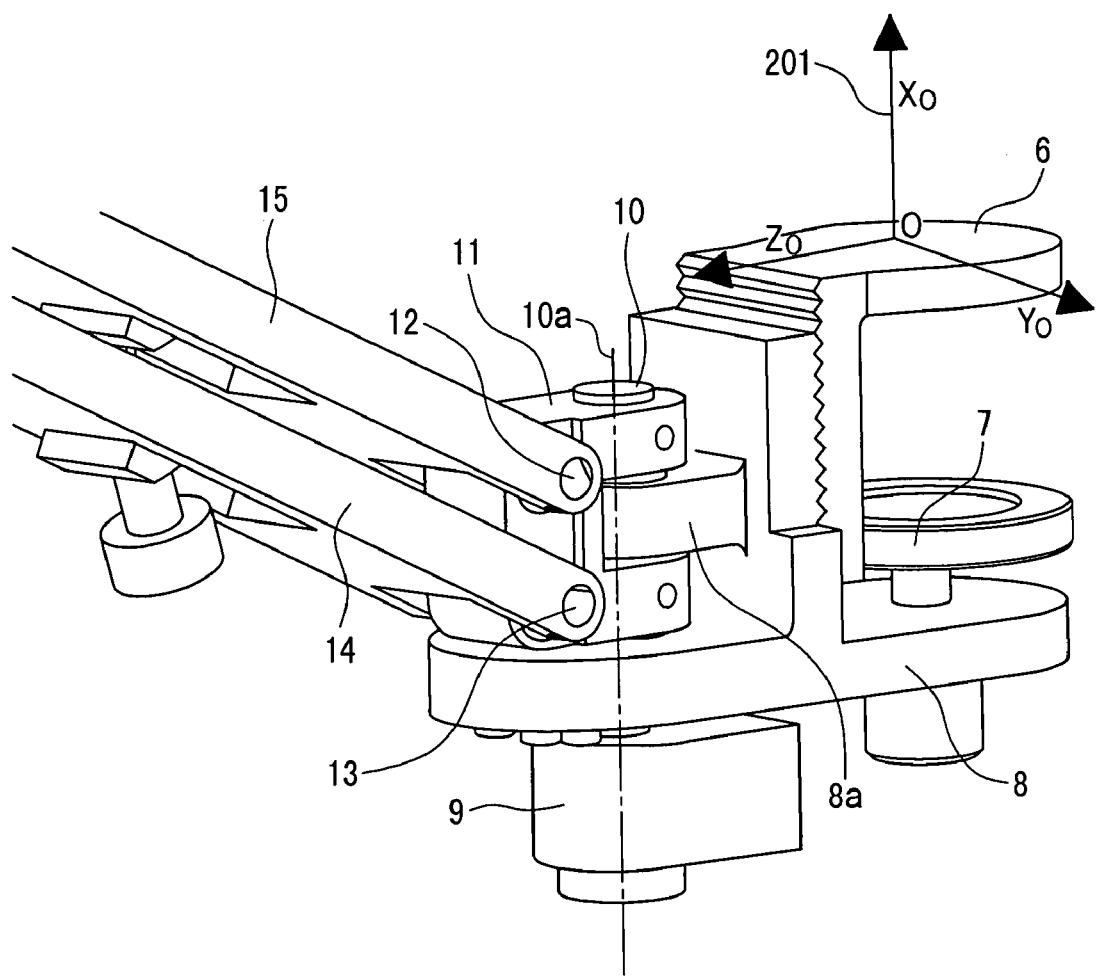
FIG. 6 shows the coordinate system of a device fixing unit.
Figure 7:
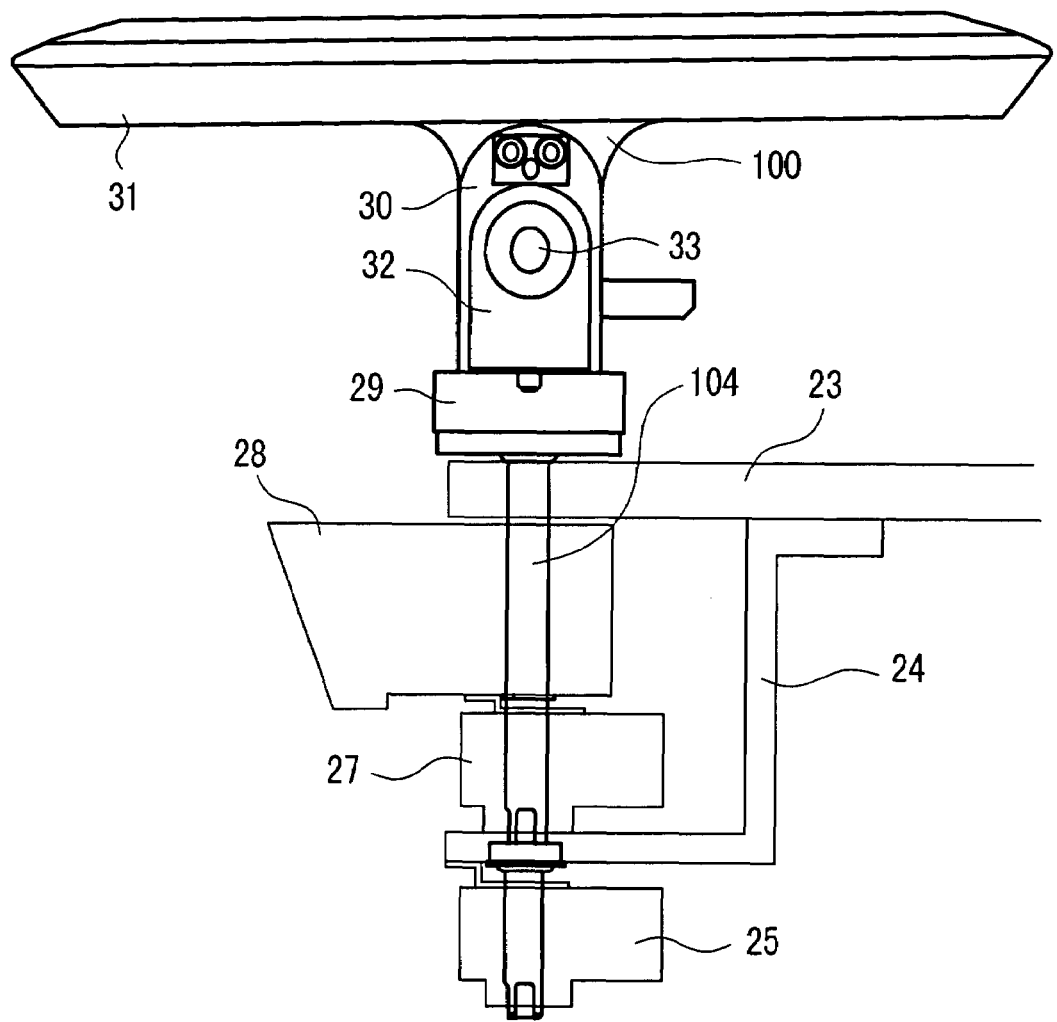
FIG. 7 is a perspective view of an armrest unit.
Figure 8:
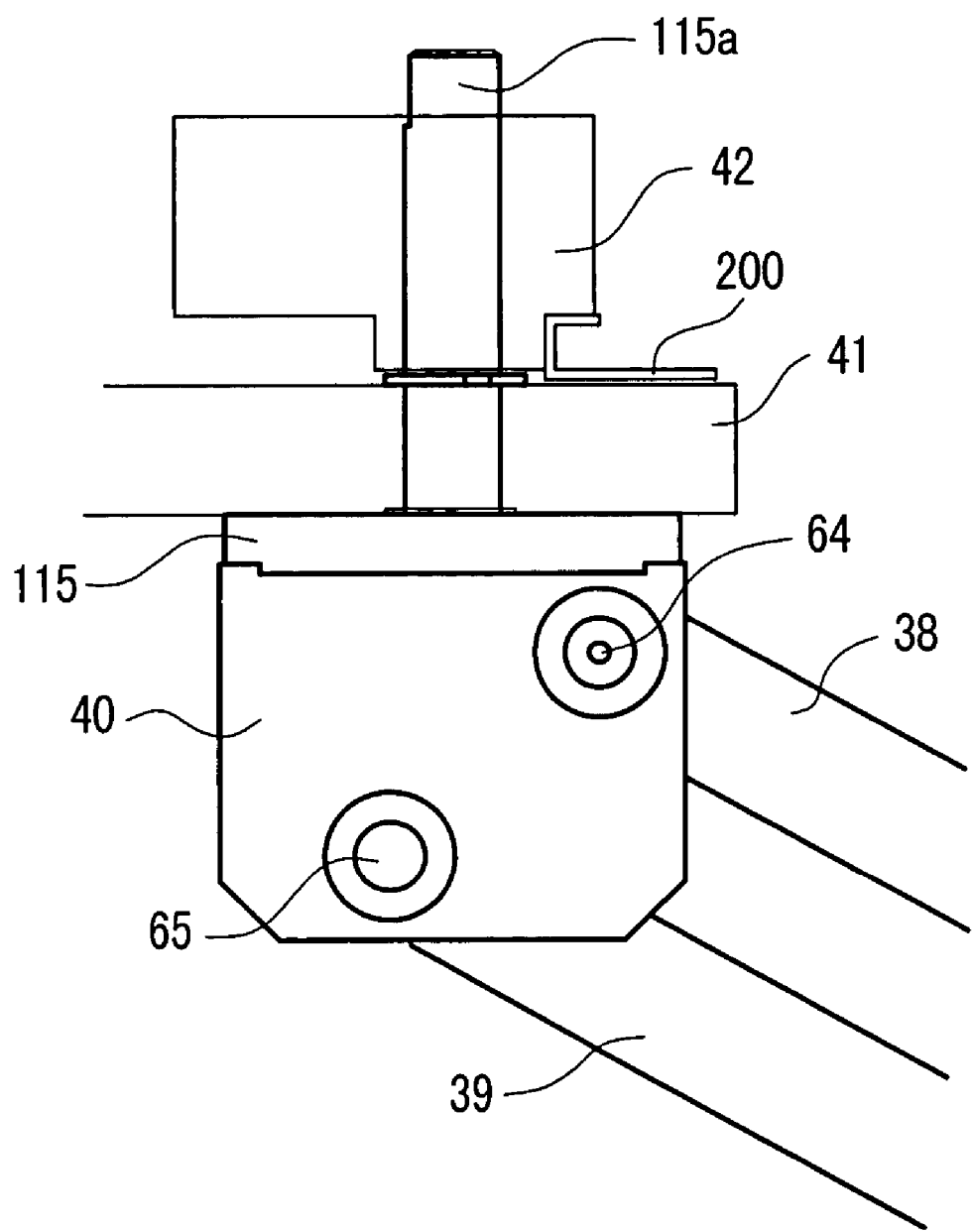
FIG. 8 is a perspective view of an attitude detection link unit.
Figure 9:
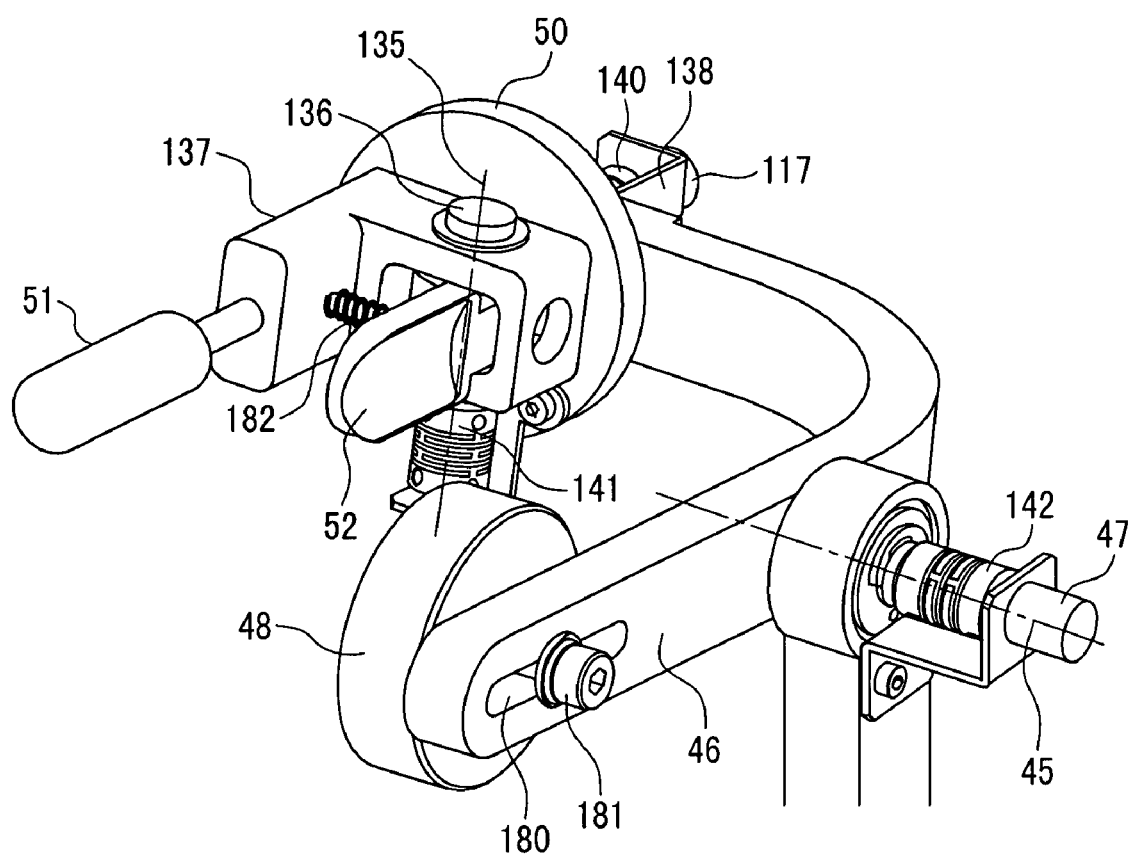
FIG. 9 is an enlarged perspective view of a holding mechanism.
Figure 10:
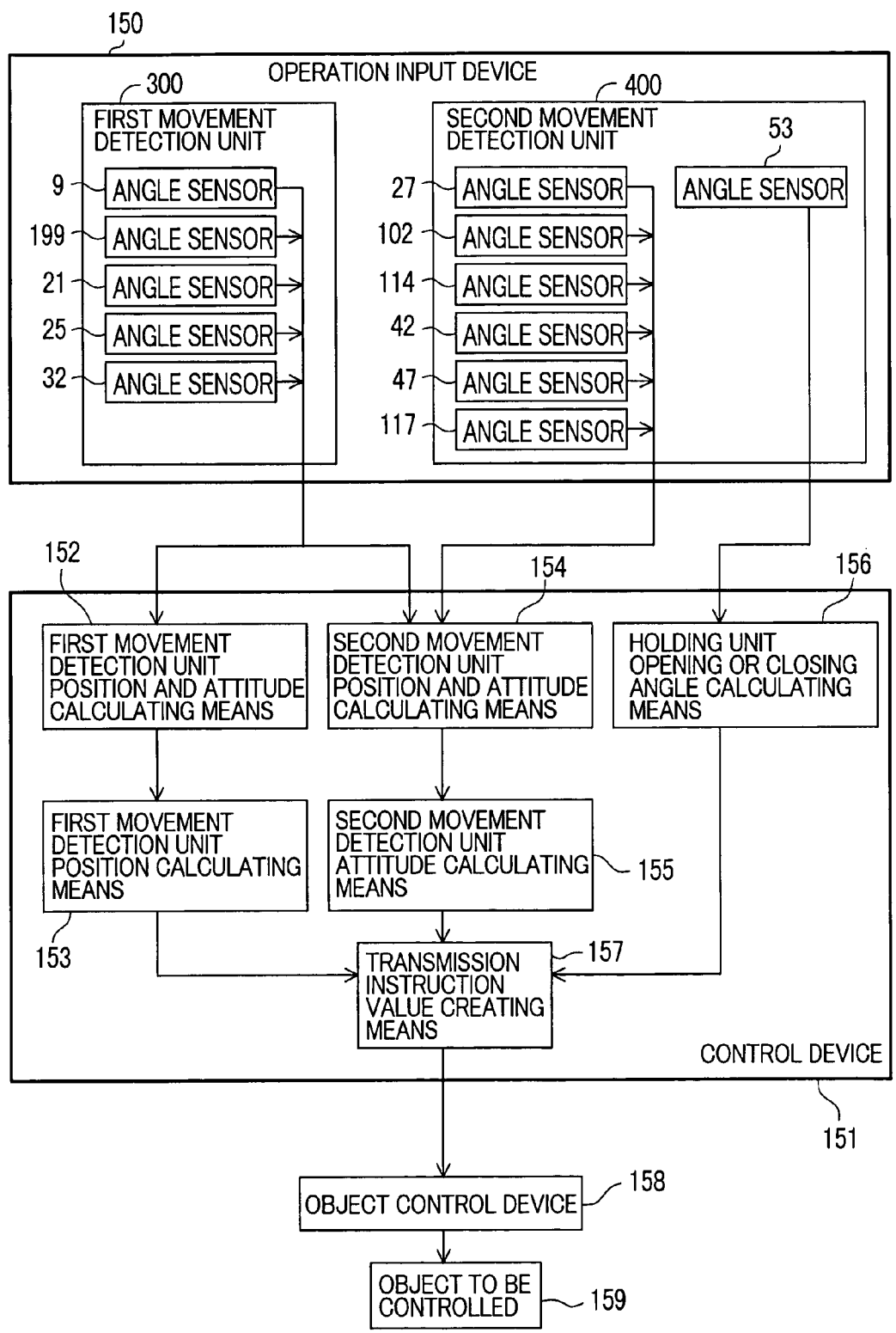
FIG. 10 shows the constitution of the device and an information flow.
Figure 11:
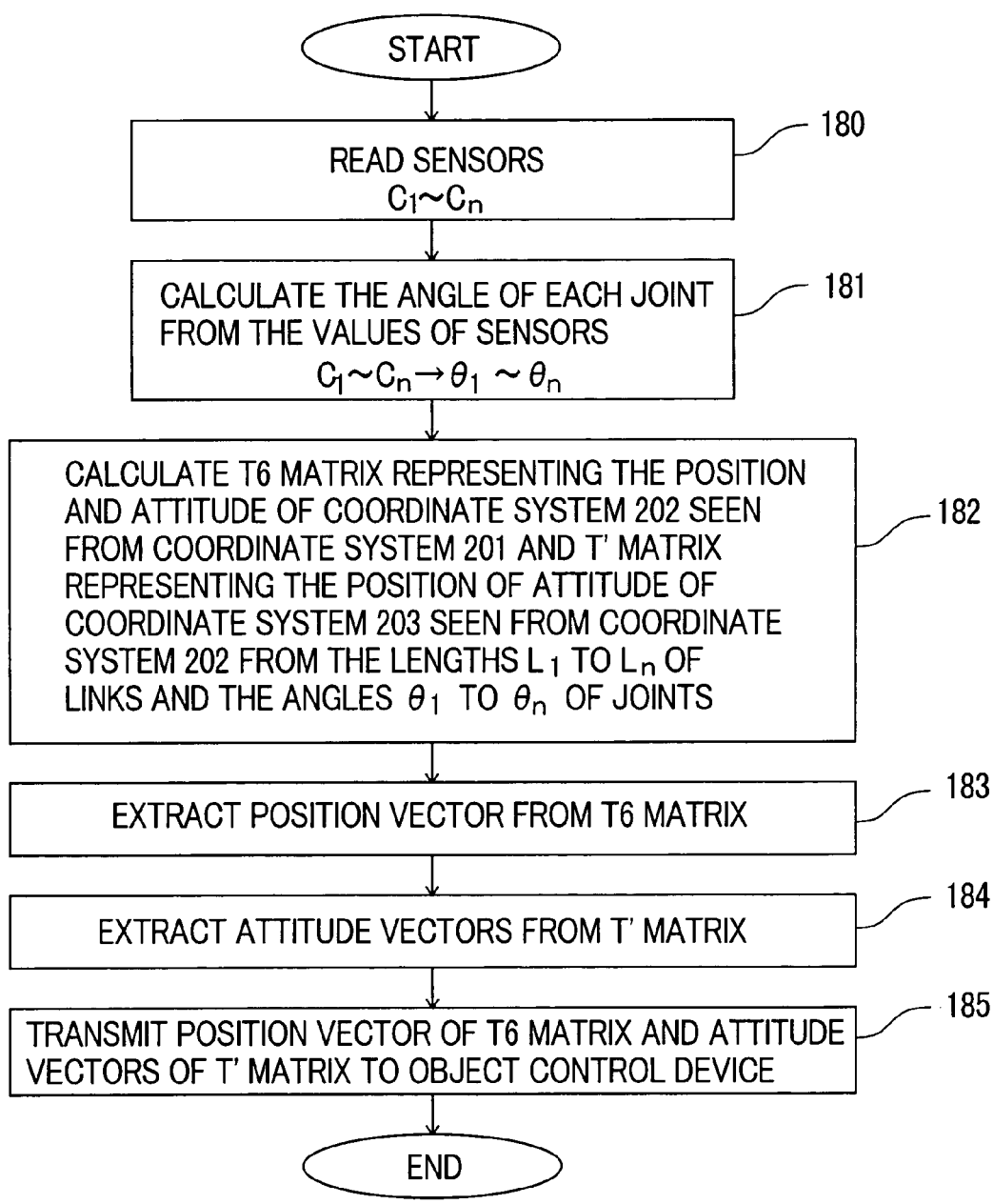
FIG. 11 shows a control flow.

FIG. 2 is a perspective view of the entire operation input device according to this embodiment. FIGS. 3 to 7 are enlarged perspective views of each part for a supplementary explanation. Particularly FIG. 6 is a diagram of a fixed coordinate system and FIG. 7 is a structural diagram showing the connections of parts of the armrest unit. FIG. 8 is a structural diagram showing the connections of parts of an attitude detection link, and FIG. 9 is an enlarged perspective view of a holding unit. FIG. 10 shows an information flow. FIG. 11 shows a control flow.

The operation input device of this embodiment comprises a position detection link 2 which is a first movement detection unit and an attitude detection link 4 which is a second movement detection unit. The first movement detection unit has a device fixing unit 1 which is fixed on a desk or chair and an armrest unit 3 which is a first operation input unit. The second movement detection unit has a holding unit 5 which is a second operation input unit for inputting an operation and held by an operator, a finger attitude link unit for detecting three degrees of freedom of the attitude of the holding unit 5 and a finger position link unit for detecting three degrees of freedom of the position of the holding unit 5.

A description is first given of the device fixing unit 1 of the first movement detection unit with reference to FIG. 2 and FIG. 6.

The operation input device is fixed on a desk or the like by sandwiching the desk between a fastening screw 7 rotatably mounted on a base unit 8 and a ceiling unit 6 of the device fixing unit 1 and turning the fastening screw 7 to narrow the space between the fastening screw 7 and the ceiling unit 6.

The device fixing unit 1 is connected to a first parallel link comprising links 14 and 15 by a hinge 11. The first parallel link forms a parallelogram together with the hinge 11 and a hinge 19. The hinges 11 and 19 and the links 14 and 15 are rotatably connected to each other by rotary shafts 12, 13, 17 and 18 and can deform the parallelogram. The angle between the first parallel link and the hinge 11 or 19 can be detected by an angle sensor 199 attached to one of the rotary shafts 12, 13, 17 and 18 (see FIG. 10). In FIG. 2 and FIG. 6, the angle sensor 199 is omitted.

A projecting connection unit 8a to be connected to the hinge 11 is mounted to the base unit 8 of the device fixing unit 1. A shaft 10 extends through the hole of the hinge 11 and the hole of the connection unit 8a. The shaft 10 is fixed in the hinge 11 and can be turned in the connection unit 8a. Therefore, the hinge 11 can freely turn on a rotation axis 10a which is the center of the shaft 10 with respect to the device fixing unit 1.

The base unit 8 is provided with an angle sensor 9. The angle sensor 9 is a hollow angle detection sensor for detecting the rotation angle of the shaft 10 with respect to the sensor body, which is fixed by inserting the shaft 10 into its hollow portion.

The shaft 10 extends through the base unit 8 and is connected to the hollow portion of the angle sensor 9. Thereby, the rotation angle of the shaft 10 with respect to the base unit 8 can be detected by the angle sensor 9.

The hinge 19 is rotatably connected to a link 23 in such a manner that it can freely turn on a rotation axis 20 which is the center of a shaft 22. The shaft 22 is fixed in the link 23, extends through the hinge 19 and is connected to the hollow portion of an angle sensor 21. The angle sensor 21 is fixed to the hinge 19. Thereby, the rotation angle of the shaft 22 with respect to the hinge 19 can be detected by the angle sensor 21.

Connections among the armrest unit 3 as the first operation input unit, the position detection link 2 as the first movement detection unit and the attitude detection link 4 as the second movement detection unit will be explained with reference to FIG. 2 and FIG. 7.

In the armrest unit 3, an armrest 31 for mounting an arm is rotatably connected to a hinge 30 by a projection unit 100 provided on the lower side of the armrest 31 in such a manner that it can turn on a rotation axis 33. The rotation angle of the rotation axis 33 with respect to the hinge 30 can be detected by an angle sensor 32. A connection shaft 104 is connected to the hinge 30 through a hinge base 29.

The link 23 and the connection shaft 104 are connected to each other in such a manner that they can turn on a rotation axis 26. The connection shaft 104 and a hinge 28 are also connected to each other in such a manner that they can turn on the rotation axis 26. An angle sensor 27 is a hollow angle sensor, its rotation detection portion is fitted onto the connection shaft 104, and its casing is fixed to the hinge 28. Thereby, the angle formed by the hinge 28 and the connection shaft 104 can be detected.

A substantially Z-shaped base 24 mounted to the link 23 connects the rotary shaft 104 to the link 23 in such a manner that it sandwiches the hinge 28 and the angle sensor 27. The rotary shaft 104 is rotatably fitted in the substantially Z-shaped base 24.

The casing of a hollow angle sensor 25 is fixed to the substantially Z-shaped base 24, and its rotation detection portion is fitted onto the connection shaft 104. Thereby, the angle formed by the link 23 and the rotary shaft 104 can be detected by the angle sensor 25.

The angle formed by the connection shaft 104 and the link 23 is an angle formed by the armrest 31 and the link 23, and the angle formed by the connection shaft 104 and the hinge 28 is an angle formed by the armrest 31 and the hinge 28.

A description is subsequently given of the constitution of the attitude detection link 4 as the second movement detection unit with reference to FIGS. 3, 4, 5 and 8.

Figure 3:
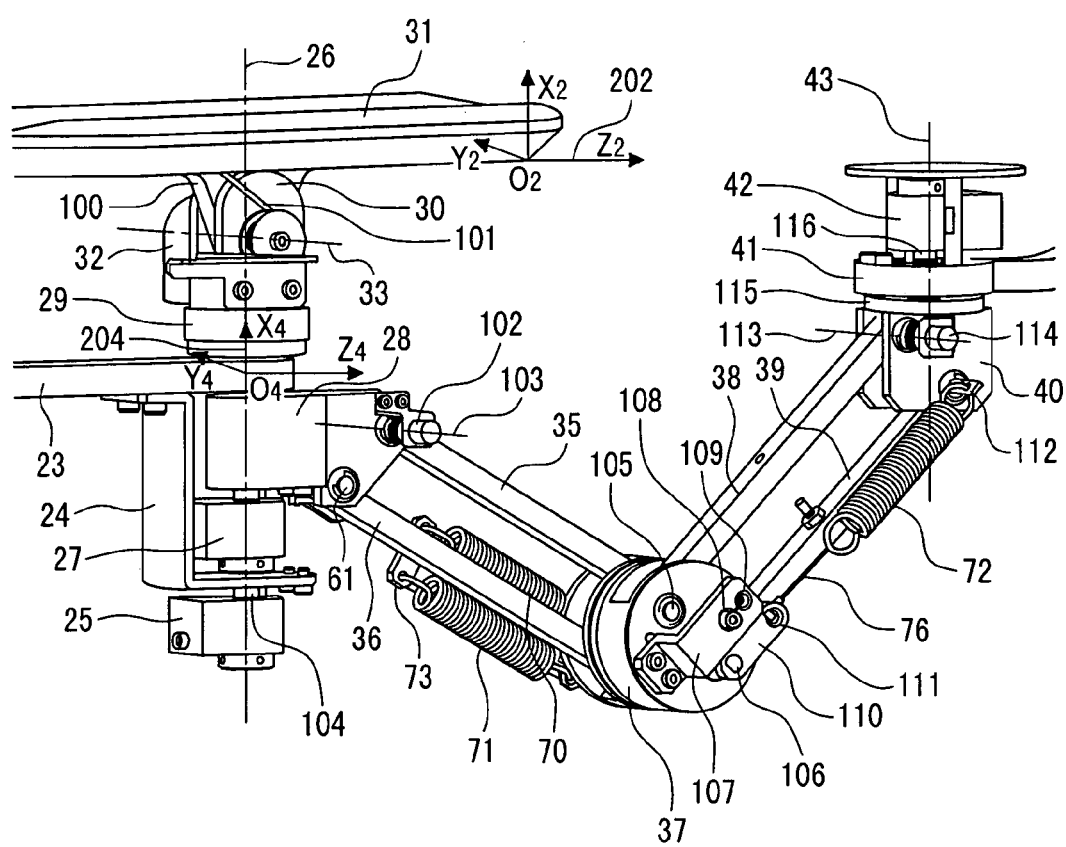
FIG. 3 is an enlarged perspective view of a mechanism.

The attitude detection link 4 comprises a holding unit 5 which is the second operation input unit for inputting an operation and held by the operator, a finger attitude link unit for detecting the three degrees of freedom of the attitude of the holding unit and a finger position link unit for detecting the three degrees of freedom of the position of the holding unit 5. FIG. 5 shows mainly the constitutions of the holding unit 5 and the finger attitude link unit, and FIGS. 3 and 4 show the constitution of the finger position link unit. FIG. 3 and FIG. 4 are perspective views from different points of view to supplement constitutions which are dead angles with each other.

The hinge 28 is rotatably connected to a link 35 and a link 36 by shafts 60 and 61 fixed on the link side, a link connection unit 37 is rotatably connected to the link 35 and the link 36 by shafts 62 and 63, and the hinge 28, link 35, link 36 and link connection unit 37 form a parallel link. In this embodiment, the shafts 60 and 62 are fixed in the link 35, and the shafts 61 and 63 are fixed in the link 36.

The rotation detection portion of an angle sensor 102 is mounted to the shaft 60, and the casing of the angle sensor 102 is fixed to the hinge 28. Thereby, the rotation angle of the shaft 60 on a rotation axis 103 with respect to the hinge 28 is detected.

As shown in FIG. 3 and FIG. 4, the link connection unit 37 has rotary shafts 105 and 106 on a center line perpendicular to a center line connecting the rotary shafts 62 and 63.

The link connection unit 37 is rotatably connected to a link 38 and a link 39 by the shafts 105 and 106, and a hinge 40 is rotatably connected to the link 38 and the link 39 by shafts 64 and 65 fixed in the links. The hinge 40, link 38, link 39 and link connection unit 37 form a parallel link. In this embodiment, the shafts 64 and 105 are fixed in the link 38, and the shafts 65 and 106 are fixed in the link 39. The shafts 64, 65, 105 and 106 are connected to the link connection unit 37 in such a manner that they can turn on respective axes.

The rotation detection portion of an angle sensor 114 is mounted to the shaft 64, and the casing of the angle sensor 114 is fixed to the hinge 40. Thereby, the rotation angle of the shaft 64 on a rotation axis 113 with respect to the hinge 40 is detected.

As shown in FIG. 8, a double shaft 115 is fixed to the hinge 40. The double shaft 115 consists of two shafts having different diameters connected to each other. Out of the two shafts, a shaft 115a having a smaller diameter is rotatably fitted in a finger link 41.

A rotation angle sensor 42 is fixed to the finger link 41 by a fixing plate 200. The shaft 115a having a small diameter of the double shaft 115 is fitted in the hollow portion of the angle sensor 42 which measures the angle between the shaft 115a and the finger link 41. Therefore, the angle sensor 42 can measure the rotation angle of the finger link 41 on a rotation axis 43 which is the center of the shaft 115a with respect to the hinge 40.

The finger link 41 has a curved portion 44 and holes at both ends. The axes of the holes are perpendicular to each other. Shafts are rotatably fitted in the respective holes. One of the rotation axes is the rotation axis 43 and the other is a rotation axis 45.

The finger link 41 is connected to a finger link 46 by a shaft 134 in such a manner that it can turn on the rotation axis 45. In this embodiment, the shaft 134 is fixed in the finger link 46 and rotatably connected to the finger link 41. The shaft 134 is connected to the rotation axis of an angle sensor 47 by a coupling 142. Since the angle sensor 47 is fixed to the finger link 41, it can detect the angle of the finger link 46 with respect to the finger link 41.

The finger link 46 has a curved portion like the finger link 41 and two crossing rotary shafts. One of the shafts is rotatably connected to the finger link 41 by the shaft 134 and the other is connected to a double shaft 50 in such a manner that it can turn on a rotation axis 49. A smaller shaft of the double shaft 50 extends through the finger link 46 and is connected to the rotation axis of an angle sensor 117 by a coupling 140. The angle sensor 117 is fixed to the finger link 46 by a fixing plate 138. Therefore, the angle sensor 117 can measure the rotation angle of the double shaft 50 with respect to the finger link 46.

A holding base 137 is fixed to the double shaft 50. The holding base 137 has a holding shaft 51. The holding base 137 is connected to a finger lever 52 by a shaft 136 in such a manner it can turn on a rotation axis 135. The shaft 136 is fixed in the finger lever 52 and has one end connected to the rotation axis of an angle sensor 53 by a coupling 141. The angle sensor 53 is fixed to the holding base 137 by a fixing plate. Therefore, the angle sensor 53 can measure the rotation angle of the finger lever 52 with respect to the holding base 137.

The coordinate systems of the operation input device of this embodiment will be described with reference to four coordinate systems shown in FIG. 3, FIG. 5 and FIG. 6.

One of the coordinate systems is a coordinate system 201 having an origin at the device fixing unit 1.

Other coordinate system is a coordinate system 204 having an origin on the rotation axis to which the link 23 and the armrest 31 are rotatably connected. The origin of the coordinate system 204 shows the reference position of a connection portion for connecting the link 23 and the armrest 31 rotatably.

Other coordinate system is a coordinate system 202 having an origin at the armrest 31.

The other coordinate system is a coordinate system 203 having an origin at the holding base 137.

The coordinates of the origin of the coordinate system 202 in the coordinate system 201 show the position of the end of the armrest 31 when seen from the device fixing unit 1. The coordinates of the origin of the coordinate system 202 in the coordinate system 201 can be calculated from physical parameters indicating the lengths of parts such as links, hinges and armrest and information from the angle sensors 9, 199, 21, 25 and 32.

The coordinates of the origin of the coordinate system 204 in the coordinate system 201 show the reference position of the armrest when seen from the device fixing unit 1. The coordinates of the origin of the coordinate system 204 in the coordinate system 201 and a rotational matrix between coordinates can be calculated from the physical parameters of parts and information from the angle sensors 9, 199 and 21. The coordinates of the origin of the coordinate system 204 in the coordinate system 201 are not influenced by a change in the movement (movement round the rotation axis 26 and the rotation axis 33) of the armrest 31.

The coordinates of the origin of the coordinate system 202 in the coordinate system 204 show the displacement of the armrest 31 when seen from the link 23. The coordinates of the origin of the coordinate system 202 and a rotational matrix between coordinates in the coordinate system 204 can be calculated from the physical parameters of parts and information from the angle sensors 25 and 32.

The coordinates of the origin of the coordinate system 203 in the coordinate system 204 show the position of the holding unit 5 and the rotation of the coordinates shows the attitude of the holding unit 5. The coordinates of the origin of the coordinate system 203 and a rotational matrix between coordinates in the coordinate system 204 can be calculated from the physical parameters of parts and information from the angle sensors 27, 102, 114, 42, 47 and 117. That is, the position and attitude of the coordinate system 203 when seen from the coordinate system 204 can be calculated.

The coordinates of the origin of the coordinate system 203 in the coordinate system 202 show the position of the holding unit 5 when seen from the armrest 31 and the rotation of coordinates shows a change in the attitude of the holding unit 5 when seen from the armrest 31. The coordinates of the origin of the coordinate system 203 and a rotational matrix between coordinates can be calculated from information on the position and attitude of the coordinate system 202 when seen from the coordinate system 204 and information on the position and attitude of the coordinate system 203 when seen from the coordinate system 204. As a matter of course, the coordinates of the origin of the coordinate system 203 and a rotational matrix between coordinates in the coordinate system 202 can also be calculated directly from the physical parameters of parts and angle information.

As will be described hereinafter, the position of the origin of the coordinate system 202 corresponds to the position of the wrist of an operator placed on the armrest 31. Therefore, the position and attitude of the coordinate system 202 when seen from the coordinate system 201 mean the position and attitude of the wrist of the operator when seen from the fixing position of the operation input device, respectively. The position and attitude of the coordinate system 203 when seen from the coordinate system 202 mean the position and attitude of a finger when seen from the wrist of the operator, respectively.

Supposing that the object to be controlled is a robot manipulator, a description is given of the operation method and the operation of the device.

The operator places his/her wrist on the armrest 31, hi/her thumb on the holding base 137 and his/her index finger on the finger lever 52 and presses the holding shaft 51 between his/her thumb and index finger to hold it by fixing the holding unit and the palm of his/her hand. This can stabilize the holding unit 5 by pressing part of it against the palm of his/her hand, thereby improving the operation efficiency of the device.

A description is given of a case where the operator likes to change only the attitude of the manipulator and a case where the operator likes to change only the position of the manipulator.

In general, when a man moves his/her finger, it is difficult for him/her to change only the attitude of his/her finger without changing the position of his/her finger. It is inevitable that the position and attitude of his/her finger are changed. Therefore, it has been difficult to give only a position instruction or an attitude instruction with the operation input device of the prior art which instructs a position and attitude only by the movement of a finger.

When the device of the present invention is used and the operator likes to change only the attitude of the manipulator, that is, to change the angle or attitude for accessing the end point of the manipulator while the position of the end of the manipulator is fixed, he/she operates the manipulator only with his/her finger without changing the position of his/her wrist. Thereby, the position and attitude of the origin of the coordinate system 203 when seen from the coordinate system 202 are changed. Only a change in attitude is extracted from changes in position and attitude and transmitted to the manipulator.

When the operator likes to change only the position of the manipulator, the input of a movement is carried out by changing the position of his/her wrist. The input of the movement of the position is carried out without changing the attitude of a part from the wrist to the finger holding the control unit. Thereby, the position and attitude of the origin of the coordinate system 202 when seen from the coordinate system 201 are changed. Only a change in position is extracted from changes in position and attitude and transmitted to the manipulator.

Since the device of the present invention can separate mechanically the detection of position control from the detection of attitude control as described above, the problem of the prior art device that position input and attitude input are mixed up can be solved and operation information which reflects the intention of the operator can be detected by an easy and intuitive operation method.

Position and attitude controls are input at the same time as follows.

As each degree of freedom of the first movement detection unit for detecting a change in position is not changed by the control of attitude in this device, what must be taken into account is a case where each degree of freedom of the position and attitude of the holding unit 5 of the second movement detection unit is changed when a position change is input by operating the first movement detection unit.

For instance, as the rotation axis 26 for connecting the armrest 31 to the link 23 is identical to the rotation axis 26 for connecting the second movement detection unit to the first movement detection unit in this device, when a change in the position of the wrist is input on the Yo-Zo plane of the coordinate system 201, the amount of rotation angle of the armrest 31 on the rotation axis 26 becomes equal to the amount of rotation angle of the second movement detection unit on the rotation axis 26 because the armrest 31 and the holding unit 5 are connected by the hand of the operator. Therefore, the attitude of the holding unit 5 remains unchanged when seen from the armrest 31. Accordingly, the attitude of the finger remains unchanged when seen from the wrist and even when the armrest 31 moves on the Yo-Zo plane, as far as the armrest 31 and the holding unit 5 are connected by a part from the wrist to the finger of the operator, information from the angle sensors of the second movement detection unit does not change. Consequently, the first movement detection unit can detect a change in the position of the wrist and the second movement detection unit can detect a change in the attitude of the finger at the same time. Therefore, the position and attitude intended by the operator can be detected separately and high operation efficiency can be provided as in a case where only the position or only the attitude is controlled.

Meanwhile, when the movement of the wrist includes a component in the Xo direction in the coordinate system 201 at the time of inputting a position and an attitude at the same time like above, the coordinate system 202 seen from the coordinate system 204 changes and the coordinate system 203 seen from the coordinate system 204 also changes at the same time. In this case, the amount of a change in the coordinate system 204 is calculated from the amount of a change in the coordinate system 202 and subtracted from the amount of a change in the coordinate system 203 to make it possible to separate the input of an operation corresponding to the movement of the wrist from the input of an operation corresponding to the movement of the finger when seen from the wrist. Accordingly, even when the position and attitude of the holding unit 5 held by the finger are changed by the movement of the wrist, the position and attitude intended by the operator can be detected separately.

When the device of the present invention is used, under all the operation conditions, for example, when only the position is to be changed, only the attitude is to be changed or both the position and attitude are to be changed, the contents of an operation intended by the operator can be detected by separating the input of a position from the input of an attitude and a more accurate movement instruction can be transmitted to the object to be controlled as the effect of the mechanism having the first movement detection unit for detecting the position of the wrist and the second movement detection unit for detecting the movement of a part after the wrist.

That is, in the present invention, a position instruction unit for carrying out a position input and an attitude instruction unit for giving an attitude instruction are provided separately. As a whole, a system having redundant degrees of freedom is constructed. Operation instruction information to be transmitted from the operation input device to the object to be controlled is prepared from position information input from the position instruction unit and position and attitude information detected by the operation instruction unit. Since the operation input device has redundant degrees of freedom, at least one of position information and attitude information to be input has redundant information. That is, position and attitude information is detected by the position instruction unit or the attitude instruction unit. The position information of the position instruction unit and the attitude information of the attitude instruction unit are extracted by removing redundant information from these and combined together to prepare information to be transmitted.

An armrest form is used as the position instruction unit capable of instructing with three or more degrees of freedom to give a position instruction at the position of the wrist. Similarly, a link mechanism extending from the armrest to the finger is used as the attitude instruction unit capable of instructing with three or more degrees of freedom.

Since position control can be carried out with the wrist, position specification is possible intuitively with the same movement as when an object held by the hand is moved.

When the position instruction unit or the attitude instruction unit has three or more redundant degrees of freedom, for example, if an attitude is input with the finger, a dislocation caused by the input of an attitude can be absorbed and if a position is input with the wrist, a change in the attitude of the wrist caused by the input of a position can be absorbed. These prevent the input of only a position or only an attitude from reducing operation efficiency and make it possible to extract information of interest with the input of an easy operation.

The operation input device having redundant degrees of freedom is provided with two control units, attitude information is deleted from the information of the position input unit, position information is deleted from the information of the attitude input unit, and position information detected by the position input unit is added to attitude information detected by the attitude input unit, and the obtained information is transmitted to the object to be controlled. Thereby, position and attitude controls are prevented from being mixed up and it is possible for even an operator having a low level of skill to carry out an operation which can reflect the intention of the operator accurately by separating position and attitude controls.

By setting a working point at the wrist, the workability of the delicate operation of a finger with the wrist as the base point is improved. When a man is to perform a delicate task or accurate task, he/she carries out the task by placing his/her wrist on a desk or the like to reduce the distance between his/her finger and the supporting point. This shows that the above task can be carried out more easily as the distance between the working point (finger) and the supporting point (wrist) becomes shorter.

The operation which has been described so far will be described with reference to an information flow shown in FIG. 10.

When the operator moves the position of his/her wrist placed on the armrest 31, the links of the first movement detection unit and the second movement detection unit move after the movement of the wrist or the finger, and a change in the angle of each degree of freedom is detected by the angle sensors 9, 199, 21, 25 and 32 of the first movement detection unit 300 and the angle sensors 27, 102, 114, 42, 47 and 117 of the second movement detection unit 400. The detected angle information is input into a control device 151.

In the control device 151, the transformation matrices of a translation map and a rotation map between coordinate systems which are the coordinate system 201 and the coordinate system 202 can be calculated from information from the angle sensors of the first movement detection unit 300 and physical parameters such as pre-known information on the lengths of parts such as the links and hinges of the first movement detection unit 300 by first movement detection unit position and attitude calculating means 152.

That is, the coordinates of the origin of the coordinate system 202 set in the first movement detection unit 300 in the coordinate system 201 of the operation input device and the amount of rotation displacement between coordinates systems which are the coordinate system 201 and the coordinate system 202 can be calculated.

Meanwhile, the angle information of the first movement detection unit 300 is also input into second movement detection unit position and attitude calculating means 154. The second movement detection unit position and attitude calculating means 154 can calculate the transformation matrices of a translation map and a rotation map between coordinate systems which are the coordinate system 202 and the coordinate system 203 from information from the angle sensors of the first movement detection unit 300 and the second movement detection unit 400 and the pre-known physical parameters of parts of the first movement detection unit 300 and the second movement detection unit 400.

For the calculation of translation matrices of a translation map and a rotation map between coordinate systems which are the coordinate system 202 and the coordinate system 203, the transformation matrices of a translation map and a rotation map between coordinate systems which are the coordinate system 204 and the coordinate system 202 and the transformation matrices of a translation map and a rotation map between coordinate systems which are the coordinate system 204 and the coordinate system 203 are calculated based on the coordinate system 204 to calculate the transformation matrices of a translation map and a rotation map between coordinate systems which are the coordinate system 202 and the coordinate system 203.

Then, only position information is extracted by first movement detection unit position calculating means 153 from information on the position and attitude of the coordinate system 202 when seen from the coordinate system 201 calculated by the first movement detection unit position and attitude calculating means 152. At the same time, only attitude information is extracted by second movement detection unit attitude calculating means 155 from information on the position and attitude of the coordinate system 203 when seen from the coordinate system 202 calculated by the second movement detection unit position and attitude calculating means 154.

Thereafter, the position information calculated by the first movement detection unit position calculating means 153 and the attitude information calculated by the second movement detection unit attitude calculating means 155 are combined together by transmission instruction value creating means 157 to obtain a transmission instruction value for position and attitude movements to the object 159 to be controlled.

The transmission instruction value obtained by transmission instruction value creating means 157 is transmitted to a control device 158 for controlling the object to be controlled. The control device 158 controls the object 159 based on the transmitted information.

Based on the above flow used in this embodiment, the operator can transmit a change in position and a change in attitude as intended by him/her to the object accurately through the operation input device, thereby making it possible to realize more accurate telecontrol.

Meanwhile, the open/close control of a holding mechanism which can be opened and closed and is provided at the end of the manipulator as the object 159 to be controlled is transmitted as follows.

To instruct the opening or closing angle of the holding mechanism of the manipulator as the object 159, the rotation angle of the finger lever 52 of the holding unit 5 is operated by the movements of the thumb and index finger.

The finger lever 52 of the holding unit 5 may be operated by holding it with the thumb.

The form of the holding unit 5 is not limited to that of this embodiment. The finger lever 52 may be omitted according to the shape of the object to be controlled. The holding unit 5 may have a form desired by the operator. Any form is acceptable if it can be operated by the finger.

The operator opens or closes the finger lever 52 of the holding unit 5 with his/her thumb and index finger and the opening or closing angle of the finger lever 52 is detected by the angle sensor 53.

The detected angle information is input into the control device 151, and holding unit opening or closing angle calculating means 156 calculates the opening or closing angle of the finger lever 52. The angle information is input into the transmission instruction value creating means 157 to obtain a transmission instruction value by combining information on the position and attitude of the object 159 to be controlled and the opening or closing angle of the object 159 as incidental information and output it to the control device 158 for the object 159. The control device 158 for the object 159 controls the opening or closing angle of the holding mechanism of the manipulator as the object 159 based on information on the closing or opening angle like the transmitted position and attitude information.

A flow of the above information will be described kinematically. The kinematical calculation of position and attitude is disclosed in many study-aid books and is made possible by using them. An example of the calculation technique will be briefly explained. Desired control is possible with a calculation procedure other than this.

To describe the kinematical control of the device, from the side of the origin of the coordinate system 202, the part whose rotation is detected by the angle sensor 9 is called "joint [1]", the part whose rotation is detected by the angle sensor 199 is called "joint [2]" (angle sensor 199 measures the angle of the shaft 12), the other end of the parallel link including the joint [2] is called "joint [3]", the part whose rotation is detected by the angle sensor 21 is called "joint [4]", the part whose rotation is detected by the angle sensor 25 is called "joint [5]", the part whose rotation is detected by the angle sensor 32 is called "joint [6]", the part which is detected by the angle sensor 27 is called "joint [7]", the part whose rotation is detected by the angle sensor 102 is called "joint [8]", the other end of the parallel link including the joint [8] is called "joint [9]", the rotary shaft 105 is called "joint [10]", the part whose rotation is detected by the angle sensor 114 is called "joint [11]", the part whose rotation is detected by the angle sensor 42 is called "joint [12]", the part whose rotation is detected by the angle sensor 47 is called "joint [13]", and the part whose rotation is detected by the angle sensor 117 is called "joint [14]".

The section from the origin of the coordinate system 201 to the joint [1] is called "0-th link", the section from the joint [1] to the joint [2] is called "first link", the section from the joint [2] to the joint [3] is called "second link", the section from the joint [3] to the joint [4] is called "third link", the section from the joint [4] to the joint [5] is called "fourth link", the section from the joint [5] to the joint [6] is called "fifth link", and the section from the joint [6] to the origin of the coordinate system 202 is called "sixth link". The coordinate system 204 is fixed at the joint [5].

The section from the origin of the coordinate system 204 to the joint [6] is called "seventh link". The section from the joint [6] to the joint [7] is called "eighth link", the parallel link including the joint [7] is called "ninth link", the parallel link including the joint [8] is called "tenth link", the section from the joint [8] to the joint [9] is called "eleventh link", the section from the joint [9] to the joint [10] is called "twelfth link", and the section from the joint [10] to the joint [11] is called "thirteenth link".

Coordinate systems 1 to 11 are set for the respective joints.

The relationship between a certain link and the following link is called "A matrix" indicative of homogeneous transformation. The A matrix represents relative translation and rotation between link coordinates.

The position and attitude of the first link when seen from the reference coordinates (coordinate system 201) are represented by A1, the position and attitude of the second link when seen from the first link are represented by A2, the position and attitude of the third link when seen from the second link are represented by A3, the position and attitude of the fourth link when seen from the third link are represented by A4, the position and attitude of the fifth link when seen from the fourth link are represented by A5, and the position and attitude of the sixth link when seen from the fifth link are represented by A6. The position and attitude of each link mean the position and attitude of a coordinate system set for each joint. For example, the position and attitude of the second link when seen from the first link mean the position and attitude of the coordinate system of the joint [2] when seen from the coordinate system of the joint [1].

The position and attitude of the sixth link when seen from the reference coordinate system 201 are calculated from the following equation when the product of the A matrix is represented by T matrix.

$$T6 = A1 \times A2 \times A3 \times A4 \times A5 \times A6$$

Since the second link is a parallel link in this embodiment, the angle between the first link and the second link and the angle between the second link and the third link are always correlative to each other and dependent from each other.

In this embodiment, the above T6 means the position and attitude of the coordinate system 202 of the armrest 31.

The contents of the T6 matrix are represented by the following numerical formula:

$$T6 = \begin{bmatrix} nx & ox & ax & px \\ ny & oy & ay & py \\ nz & oz & az & pz \\ 0 & 0 & 0 & 1 \end{bmatrix} \quad \text{[Numerical formula 1]}$$

wherein n, o and a are vectors representing the directions of the axes of the coordinate system 202 when seen from the coordinate system 201, and p is a vector representing the position of the origin of the coordinate system 202 when seen from the coordinate system 201. Therefore, the attitude of the coordinate system 202 when seen from the coordinate system 201 is represented by the vectors n, o and a, and the position of the coordinate system 202 is represented by the vector p.

Similarly, the A matrix representing relative translation and rotation between the coordinates of each link is integrated to calculate T matrix representing the position and attitude of the coordinate system 203 when seen from the coordinate system 202. This is represented by T'. The contents of T' are represented by the following numerical formula:

$$T' = \begin{bmatrix} nx' & ox' & ax' & px' \\ ny' & oy' & ay' & py' \\ nz' & oz' & az' & pz' \\ 0 & 0 & 0 & 1 \end{bmatrix} \quad \text{[Numerical formula 2]}$$

wherein n', o' and a' are attitude vectors for respective coordinate axes and p' is a position vector like T6.

The position of the first movement detection unit is represented by the vector p, the position of the second movement detection unit when seen from the coordinate system 202 is represented by the vector p', and the attitude of the second movement detection unit is represented by the vectors n', o' and a'.

The first movement detection unit position and attitude calculating means 152 shown in FIG. 10 calculates T6, and the first movement detection unit position calculating means 153 extracts the vector p from T6. The second movement detection unit position and attitude calculating means 154 calculates the position and attitude T' of the second movement detection unit when seen from the coordinate system 202, and the second movement detection unit attitude calculating means 155 extracts the attitude vectors n', o' and a' from T'.

The transmission instruction value creating means 157 transmits the vector p as position information and the vectors n', o' and a' as attitude information to the object control device 158.

Thereby, the position and attitude of the first movement detection unit and the position and attitude of the second movement detection unit are calculated from information from the sensors and physical information on the lengths of links, position information is separated from attitude information, necessary information is extracted from the separated position information and attitude information, and a specific component can be transmitted to the object to be controlled.

Thereby, the input of an operation in which position and attitude are separated from each other can be realized by this device.

The above flow will be explained with reference to the control flow of FIG. 11.

For control, the procedure from the detection of sensor values every a sampling time of several milliseconds to the transmission of information to the object to be controlled is repeated.

Control to be carried out in this embodiment is to transmit three different pieces of information, that is, position information, attitude information and open/close information to the object to be controlled. FIG. 11 shows this control flow from the detection of sensor values to the transmission of position information and attitude information to the object to be controlled. The open/close information is transmitted to the object after position information and attitude information by detecting the output values of the sensors and converting sensor information into angle information. To prevent the figure from becoming complicated, the open/close information is omitted.

First, a control loop starts at a predetermined timing to measure the output values of sensors (step 180). The angles of joints are calculated from the measured values (step 181). The position and attitude (T6 matrix) of the coordinate system 202 when seen from the coordinate system 201 and the position and attitude (T' matrix) of the coordinate system 203 when seen from the coordinate system 202 are calculated from the calculated angles and data on the preset lengths of the links (step 182). The position vector is extracted from the T6 matrix (step 183), and the attitude vectors are extracted from the T' matrix (step 184). The extracted data are transmitted to the object to be controlled (step 185).

A series of these steps are repeated every a sampling time.

It is said that an operation input device having six degrees of freedom suffices for the operation of an object to be controlled having six degrees of freedom. In contrast to this, this embodiment is an operation input device which has five degrees of freedom for the detection of a position and six degrees of freedom for detecting an attitude and comprises a series of links capable of controlling these intuitively. It may be an operation input device having three degrees of freedom for the detection of a position (for example, x, y and z of 3-D rectangular coordinates). Further, required position information and attitude information are extracted from position and attitude information detected by the first movement detection unit (position input unit) and position and attitude information detected by the second movement detection unit (attitude input unit) to prepare information to be transmitted to the object to be controlled, thereby making it possible to clearly separate the input of position control and the input of attitude control from each other.

The first movement detection unit of this embodiment is a mechanism for detecting the position of the wrist and has redundant degrees of freedom (five degrees of freedom) so that the movement of the wrist is not prevented. The input of a position can be carried out by changing the position of the wrist intuitively with a comfortable attitude without limiting the attitude of the wrist and without being interfered by the mechanism of the operation input device.

The second movement detection unit is a mechanism for detecting the attitude of a finger and has redundant degrees of freedom (six degrees of freedom) so that the movement of the finger is not prevented. The input of an attitude can be carried out by changing the attitude of a finger intuitively with a comfortable movement without limiting the movement and position of the finger and without being interfered by the mechanism of the operation input device.

As described above, the operation input device has a structure with degrees of freedom for detecting information required for control and degrees of freedom for improving operation efficiency at the time of operation. Therefore, high operation efficiency and the accurate reflection of an intention can be realized at the same time by carrying out control for preparing only necessary information by separating necessary information from unnecessary information.

One operation input device is provided with two input parts and the position and attitude of each of the parts are detected. A change in attitude detected by the position input unit is resulted by the provision of degrees of freedom for improving operation efficiency and is information irrelevant to the input of position control. Similarly, a change in position detected by the attitude input unit is resulted by the provision of degrees of freedom for improving operation efficiency and is information irrelevant to the input of attitude control. Changes for improving operation efficiency are removed by the processing of the control device, thereby making it possible to transmit only necessary information to the object to be controlled at a time. Thereby, the operation input device has high operation efficiency and can transmit the contents of an instruction for attitude control or the contents of an instruction for position control intended by the operator, or the contents of an attitude and position mixed operation to the object to be controlled accurately as the operator intends.

Since a position and an attitude can be input separately, it is possible to prevent operation information from including unintended changes in position and attitude and the occurrence of an unintended movement. For example, when a medical manipulator is to be operated, it can be operated without giving unnecessary damage to surrounding normal tissues. Since an operation accompanied by the application of unnecessary force to the organ can be prevented in the case of the inosculation of a blood vessel which is easily damaged, the manipulator can be moved accurately as intended by the operator and a treatment can be made with the precise movement of the manipulator without damaging the organ.

There are two separate input parts, i.e., a wrist and a finger, and the input of a position can be carried out with the wrist. When only the position is to be moved while the attitude is maintained or when only the attitude is to be changed for approach while the position is maintained, a high level of skill for inputting only an intended movement while paying attention to information desired to be retained as in the operation input device of the prior art is not required. Thereby, an intention can be easily reflected by a more natural operation.

To carry out delicate control or accurate control with a finger, as the supporting point can be set at the wrist, the distance between the operation unit and the supporting point can be short, thereby making it easy to carry out delicate control.

In the present invention, the difficulty of control for reflecting the intention of the operator on the object to be controlled accurately is removed, and delicate and accurate control can be transmitted to the object to be controlled as intended by the operator without depending on the skill of the operator. Therefore, the same high level of control as that of the operator can be realized even by a beginner, and the efficiency of work and the quality of work can be improved.

Since the finger position link unit of the second movement detection unit consists of two parallel links which are perpendicular to each other, even when the finger attitude link unit is displaced by the deformation of the finger position link unit, the finger attitude link unit moves in the X3 direction and the Y3 direction of the coordinate system 203 without changing its attitude. Therefore, the influence on the finger attitude link unit of a change in the position of a finger in the X3 direction and the Y3 direction caused by the operation of the holding unit 5 so that it absorbs the change in position, that is, a change in attitude caused by the change in position can be prevented.

In this case, to calculate the amount of a change in the attitude of the finger, the amount of rotation on X3 of the holding unit 5 can be calculated from a difference between the amount of rotation on the rotation axis 26 and the amount of rotation on the rotation axis 43 to be taken into consideration as changes in the finger position link unit. Thus, by reducing the influence upon the change of the finger attitude link unit of the change of the finger position link unit, the calculation of the attitude of the holding unit 5 becomes easy, the amount of calculation can be reduced, and the control system can be simplified. This leads to the stability and reliability of control.

In this embodiment, the moving ranges of the parallel links constituting the finger position link unit are within the plane perpendicular to the Y4-Z4 plane of the coordinate system 204. They may be within the plane perpendicular to the X4-Y4 plane as a variation of this embodiment.

In this case, the displacement of the finger attitude link unit caused by a change in position in the Y3 direction and Z3 direction of the finger caused by the operation of the holding unit 5 can be prevented.

When the finger position link unit composed of a parallel link system which moves within the plane perpendicular to the Y4-Z4 plane as in this embodiment is connected to a parallel link system which moves within the plane perpendicular to the X4-Y4 plane, the displacement of the finger attitude link unit caused by a change in position in all the directions of the coordinate system 203 of a finger which takes place when the holding unit 5 is operated can be prevented, thereby making it possible to simplify the control system.

In this embodiment, the finger position link unit and the finger attitude link unit of the second movement detection unit are provided with a dead weight compensation mechanism to reduce force required for operation. A description is given of the dead weight compensation mechanism with reference to FIG. 3, FIG. 4, FIG. 5 and FIG. 9. In the case of a parallel link, the term "dead weight compensation" means the compensation of dead weight including the total weight of parts constituting the parallel link and the weight of parts connected to the parallel link, which becomes a load for deforming the parallel link.

FIG. 4 shows a mechanism for compensating the dead weight of the first parallel link of the second movement detection unit, which consists of the hinge 28, links 35 and 36 and connection unit 37, and the weight applied to this parallel link of a link system extending to the holding unit 5 from the parallel link. The total of the dead weight of the first parallel link and the weight of the link system extending to the holding unit 5 is called "first compensation weight". This compensation mechanism is a mechanism for compensating for a shift of the first parallel link in the X3 direction of the coordinate system 203 by the first compensation weight with compensation springs 70 and 71.

The hinge 28 is provided with a wire fixing unit 120. A wire path guide 74 is fitted onto the shaft 61 of the link 36. A spring connection tool 76 is fitted onto the shaft 63 of the link 36. The spring connection tool 76 is connected to the compensation springs 70 and 71, and a spring connection tool 73 is connected to the other ends of the compensation springs 70 and 71. A wire 75 is fixed to the spring connection tool 73. The wire 75 passes through a path guide hole 145 formed in the wire path guide 74 and the fixing hole 121 of the wire fixing unit 120 and is fixed by a fixing screw 122.

To reduce friction between the wire 75 and the wire path guide 74 when the wire 75 passes through the path guide hole 145 of the wire path guide 74, the wire 75 is let pass through a guide tube 144 and pass through the path guide hole 145 together with the guide tube 144. Thereby, the wire can slide with reduced friction.

The wire path guide 74 and the spring connection tool 76 are fitted onto the shafts 61 and 63 fixed in the link 36, respectively, and change their directions in synchronism with the rotation of the shafts. That is, the wire path guide 74 and the spring connection tool 76 always keep the same direction with respect to the link 36.

When the link 36 turns round the shaft 61 in the X3 direction of the coordinate system 203, the length of the path between the path guide hole 145 and the fixing hole 121 extends. Thereby, the compensation springs are extended to generate tension in the wire 75. The tension is generated in the direction of a straight line connecting the path guide hole 145 and the fixing hole 121 to become force for turning the link 36 round the shaft 61 in the X3 direction.

Thereby, when the operator holds the holding unit 5 to move it in the X3 direction, a load applied to the first parallel link by the first compensation weight can be reduced.

FIG. 3 shows a mechanism for compensating the dead weight of the second parallel link of the second movement detection unit, which consists of the connection unit 37, links 38 and 39 and hinge 40, and the weight of a link system extending to the holding unit 5 from the parallel link. The total of the dead weight of the second parallel link and the weight of the link system extending to the holding unit 5 is called "second compensation weight". This compensation mechanism is a mechanism for compensating for a shift of the second parallel link in the X3 direction of the coordinate system 203 by the second compensation weight with a compensation spring 72.

The connection unit 37 is provided with a wire fixing unit 107. A wire path guide 110 is fitted onto the shaft 106 of the link 39. A spring connection tool 112 is fitted onto the shaft 65 of the link 39. The compensation spring 72 is connected to the spring connection tool 112, and a wire 76 is connected to the other end of the compensation spring 72. The wire 76 passes through a path guide hole 111 formed in the wire path guide 110 and through the fixing hole 109 of the wire fixing unit 107 and is fixed by a fixing screw 108.

As shown in FIG. 3, in a part where the wire 76 slides in the path guide hole 111, the wire is covered with a guide tube to reduce friction like the first parallel link.

The wire path guide 110 and the spring connection tool 112 are fitted onto the shafts 106 and 65 fixed in the link 39, respectively, and change their directions in synchronism with the rotation of the shafts. That is, the wire path guide 110 and the spring connection tool 112 always keep the same direction with respect to the link 39.

When the link 39 turns round the shaft 106 in the X3 direction of the coordinate system 203, the length of the path between the path guide hole 111 and the fixing hole 109 extends. Thereby, the compensation spring 72 is extended to generate tension in the wire 76. The tension is generated in the direction of a straight line for connecting the path guide hole 111 and the fixing hole 108 to become force for turning the link 39 round the shaft 106 in the X3 direction. Thereby, when the operator holds the holding unit 5 to move it in the X3 direction, a load applied to the second parallel link by the second compensation weight can be reduced.

FIG. 5 and FIG. 9 show a weight balance mechanism around the rotation axis 45 of the link 46. The link 46 is provided with the holding unit 5 at one end. It has a balance weight 48 at the other end. A fixing screw 181 is let pass through a prolonged hole 180 formed in the link 46 in a longitudinal direction to adjust the position of the balance weight and fastened to fix the balance weight at any position of the prolonged hole 180. The balance weight is designed to have a weight that enables the rotation torque of the link 46 round the rotation axis 45 to be adjusted to null by the balance of its dead weight. This prevents operation force from becoming nonuniform in the operation direction by the load of the dead weight of the holding units when the holding unit 5 is moved to any position round the rotation axis 45, thereby making it possible to operate the holding unit 5 with the same force no matter what attitude is taken by the holding unit 5. The operator does not need to bear the load of the weight of the link system and can operate the holding unit with light force, thereby improving operation efficiency.

As described above, by providing a mechanism for compensating the dead weight components of the finger position link unit and the finger attitude link unit of the second movement detection unit including a moving component in the X3 direction of the coordinate system 203, operation can be carried out with lighter force, thereby making it possible to improve operation efficiency and to reduce the load of the operator. This has the effect of reducing the fatigue of the operator and enabling the operator to concentrate himself on a task which requires long-term operation for a long time.

The dead weight compensation mechanism may be replaced by means other than that of this embodiment. For example, the arrangement of the springs and the paths of the wires are not limited to those of this embodiment. When a mechanism for offsetting all the torque using the balance weight like the finger attitude link unit without using springs is used as the dead weight compensation mechanism of the parallel link which is the finger position link unit, the same effect can be obtained.

It is known that the following advantages can be obtained by providing a dead weight compensation mechanism in the parallel link as in this embodiment as compared with a structure that a dead weight compensation mechanism is provided in a serial link system in which links are rotatably connected to each other.

For the dead weight compensation of one link, dead weight compensation is carried out by generating rotation torque in a direction opposite to the direction of rotation by the dead weight of the link with a rotation connection unit at one end of the link. In this case, the torque around the rotation axis of a load provided at the other end of the rotation connection unit whose dead weight is to be compensated needs to be constant. The torque around the rotation axis changes according to the distance of the load from the rotation axis.

Meanwhile, in the case of a parallel link as in this embodiment, it is known that when the attitude of the load changes, this change affects the elongation of the link constituting the parallel link or compression force and not the torque around the rotation axis. Describing this with reference to this embodiment, when the attitude of the finger attitude link unit is changed by control, compression force and elongation force received by the links 38 and 39 constituting the parallel link are changed but the rotation torque of the rotary shafts 105 and 106 remains unchanged. Similarly, when the shape of the parallel link including the links 38 and 39 changes, compression force and elongation force received by the links 35 and 36 constituting the other parallel link are changed but the torque of the rotary shafts 62 and 63 remains unchanged.

Therefore, even when the shapes of the finger position link unit and the finger attitude link unit change during operation, the effect of the dead weight compensation mechanism provided in the parallel link remains unchanged. Accordingly, the operator does not feel variations in operation efficiency that he/she feels the links are heavy or light during operation and further the parallel link does not move by itself in one direction due to the imbalance of dead weight compensation when he/she changes the link to a specific attitude, thereby improving safety.

There is known a structure for obtaining this effect kinematically other than the structure of the parallel link shown in this embodiment. The structure capable of obtaining the similar kinematical effect can improve the safety of a control system and the safety of operation as in this embodiment.

In this embodiment, the angle of a straight line connecting the rotary shafts 60 and 61 from the vertical direction is 45°. Similarly, in a series of parallel links, the angles of a straight line connecting the rotary shafts 62 and 63, a straight line connecting the rotary shafts 105 and 106 and a straight line connecting the rotary shafts 64 and 65 from the vertical direction are 45°. This has the effect of widening the movable range of the holding unit 5 in this embodiment.

When the operator places his/her wrist on the armrest 31 to hold the holding unit 5 with his/her fingers, the parallel links for connecting the holding unit 5 and the armrest 31 are connected to each other in such a manner that they cross each other at a certain angle as shown in FIG. 2 to enable the holding unit 5 to be moved from that attitude in directions corresponding to three degrees of freedom. When straight lines connecting the above rotary shafts are in the same direction as the vertical direction and perpendicular to that direction, at the centers of the movable ranges of the parallel links, the links become perpendicular to a straight line connecting the rotary shafts and the parallel links become horizontal and vertical. In the case of a structure that the initial attitude is taken by deforming the parallel links from that attitude to an attitude that enables a man to hold the holding unit 5 as shown in FIG. 2, the movable range in which the parallel links can be changed from this initial attitude becomes narrow in the direction of deforming the parallel links with the result that the position of the initial attitude shifts from the center of the operation range of the operator and is located at the corner of the operation possible range; thereby making it impossible to secure a sufficiently large operation range. In contrast to this, when straight lines connecting the rotary shafts are at 452 from the vertical direction so that the parallel links can take their initial attitudes while they are kept perpendicular to the straight lines connecting the rotary shafts as shown in FIG. 2 of this embodiment, the position of the initial attitude becomes close to the center of the operation possible range, thereby making it possible to secure a sufficiently large operation range.

With the structure capable of constructing an operation system which can make the best use of the movable ranges of the parallel links, the links 35, 36, 38 and 39 can be made shorter and the distances of straight lines connecting the rotary shafts can be reduced.

Since the parallel link system can be made compact, the object of the present invention can be attained with smaller force required for dead weight compensation, for example, the spring constant of a spring. Therefore, reductions in the size and weight of the dead weight compensation mechanism and a reduction in cost can be expected.

Due to these effects, the weight of the whole device can be reduced and a load when the device is installed or carried can be reduced.

Meanwhile, the same effect can be obtained by providing a torque sensor and an actuator to the movable units of this embodiment without the dead weight compensation mechanism. Further, the control of the actuator makes it possible for each degree of freedom of the second movement detection unit to maintain its angle even when the operator releases his/her hand. The operation range can be transmitted to the operator, the operation input is limited or inhibited according to the situation of the object to be controlled, or a variety of information can be provided to the operator through the operation input device. Therefore, higher safety and higher operation efficiency can be realized.

When a very small part is sutured by fixing its position and using a manipulator, the actuator of the first movement detection unit can be controlled such that it is fixed and does not move even when force is applied to the actuator. Thereby, it is not necessary to pay special attention not to change the position of a wrist, and finer and more accurate control can be realized by concentrating on the attitude of a finger.

Another Embodiment

As a variation of control, operation efficiency more suitable for each situation can be realized by changing the type of information to be detected by the first movement detection unit and the second movement detection unit according to the use situation.

For example, six degrees of freedom of the object to be controlled can be controlled with six degrees of freedom of a finger of the second movement detection unit. When a rough movement is to be made, the same operation input as in the prior art can be made only with six degrees of freedom of the second movement detection unit by changing a control variation with a foot switch. In this case, operation can be carried out by switching to this proposed operation method in which position and attitude are detected separately according to the intention of a user, unnecessary information is removed, and necessary information is prepared. To realize the control of six degrees of freedom only with the second movement detection unit, the position vector and attitude vectors are specified from the calculation results of the T' matrix shown in the first embodiment and transmitted to the object to be controlled.

As a variation of the mechanism, it is conceivable that the rotation axis for connecting the armrest unit 3 and the link 23 and the rotation axis for connecting the second movement detection unit and the first movement detection unit are different from each other and that the second movement detection unit is provided at the end of the armrest 31.

When the rotation axis for connecting the armrest unit 3 and the link 23 and the rotation axis for connecting the second movement detection unit and the first movement detection unit are different from each other, the position and attitude of the coordinate system 203 when seen from the coordinate system 202 are changed by the movement of the armrest 31 within the Yo-Zo plane.

Not shown in the figures, the coordinate system 204 provided at the rotation axis for connecting the armrest unit 3 and the link 23 is set as in the first embodiment and the coordinate system 205 is separately provided at the rotation axis for connecting the second movement detection unit and the first movement detection unit. The coordinate system 205 is translated and mapped by the distances of the rotation axes of the coordinate system 204. The position and attitude of the coordinate system 204 when seen from the coordinate system 201 and the position and attitude of the coordinate system 202 when seen from the coordinate system 204, the translation maps of the coordinate system 204 and the coordinate system 205, and the position and attitude of the coordinate system 203 when seen from the coordinate system 205 can be detected and calculated by using angle sensors and mechanical parameters such as distances between rotation axes. Therefore, changes in the position and attitude of the coordinate system 203 when seen from the coordinate system 202 caused by the movement of the armrest within the Yo-Zo plane can be calculated from these. Accordingly, the same effect can be obtained as in the first embodiment in which the rotation axis for connecting the armrest unit 3 and the link 23 and the rotation axis for connecting the first movement detection unit and the second movement detection unit are aligned with each other.

When the rotation axis for connecting the second movement detection unit is connected to the end of the armrest 31 and not to the link 23, the coordinate system 204 and the coordinate system 202 are mechanically aligned with each other.

As far as the attitude of a part after the wrist of the operator is not changed by moving only the armrest 31 in any direction Xo, Yo or Zo of the coordinate system 201, the coordinate system 203 of the holding unit 5 when seen from the coordinate system 202 of the armrest 31 is always fixed. Therefore, the position and attitude of the holding unit 5 when seen from the armrest 31 can be calculated from only the information of the angle sensors of the second movement detection unit without using the information of angle sensors which indicate changes in the position and attitude of the armrest 31. The effect of this embodiment includes the effect of the first embodiment and also a new effect that the control system is simple. Further, the number of error factors included in the calculation result caused by a processing size error and a measurement error can be reduced by reducing the number of calculation steps, thereby making possible more accurate control. A more robust device can be obtained by reducing the influence of errors.

The device for inputting a position by placing a wrist on the armrest 31 is shown in the first embodiment. However, a device may be constituted such that a position is input with a part other than a wrist according to application purpose and a request from a user.

For example, an elbow rest for placing an elbow is provided in place of the armrest 31 for placing a wrist. The position of the elbow rest becomes a part for inputting the position of the first movement detection unit. The second movement detection unit is provided to the elbow rest such that the holding unit 5 is situated at the position of a finger of the operator as in the first embodiment. With this constitution, the same operation efficiency as in a case where the user puts his/her elbow on the desk and carries out a delicate task close at the height of his/her eyes can be obtained.

An interface device such as a foot switch is used as the function of generating a permission signal for inputting a position in order to prevent the input, detection or reflection on operation of a positional change not intended by the user when unrequired force is applied to the first movement detection unit during operation. The user steps on the foot switch to generate a signal for permitting a positional change and then controls the position of the first movement detection unit. Thereby, safety can be improved. An actuator or brake is provided to the rotation axes of the first movement detection unit to connect the control of the actuator or brake with the signal of the interface device. That is, when a signal from the interface device does not indicate the permission of position control, even if force is applied to the first movement detection unit, the actuator is not activated or the brake is driven to prevent a change in the position of the first movement detecting unit. When a signal from the interface device indicates the permission of position control, each rotation axis is controlled according to force applied to the first movement detection unit without fixing the output shaft of the actuator. Alternatively, the brakes of the rotation axes are deactivated not to block the movement of the first movement detection unit.

Safety and operation efficiency can be further improved by combining a device for controlling the rotation angle of each joint or changing the friction of rotation, such as an actuator or brake with an interface device for reflecting the intention of the user.

Safety can also be improved by providing a sensor for detecting whether the user places his/her wrist on the armrest or not as a variation of the above constitution using an interface device. That is, an optical sensor is embedded in a part where the wrist is placed on the armrest so that the output of the sensor is turned on or off according to the existence of the wrist. Only when the left or right wrist is detected, the operation of the actuator is permitted or the brake is deactivated. Alternatively, only when the left or right wrist is detected and an operation permission signal is received from the foot switch, the operation of the actuator is permitted or the brake is deactivated. Alternatively, when the left or right wrist is not detected, operation instruction information is not transmitted to the object to be controlled. Safety when the device is used can be improved by these controls.

In the first embodiment, an angle sensor is provided to each joint. If the positions and attitudes of the first movement detection unit and the second movement detection unit are detected, another means for obtaining the same effect may be used to detect the positions and attitudes. For example, an optical 3-D movement measuring instrument may be used. Commercially available products of the instrument include OPTOTRAK and Polaris marketed from Northern Digital Inc. With these devices, a plurality of reflection or emission type markers are attached to an object to be measured and the positions and attitudes of the markers are calculated by looking at the markers from a camera installed at a place far from the markers to obtain the position and attitude of the object from the positions and attitudes of the markers. When these devices are used, a plurality of markers are attached to the first movement detection unit and the second movement detection unit to measure the positions and attitudes of the positions to which the markers have been attached optically. Thereby, the same effect as that of the first embodiment can be obtained without using rotation angle sensors.

A device using magnetic sensors other than optical sensors is also available on the market and can measure specific positions and attitudes likewise. Therefore, the same effect can be obtained.

INDUSTRIAL FEASIBILITY

The operation input device of the present invention can be used for not only medical equipment such as an operating manipulator which requires precise handling but also input devices for computer graphics.

What is claimed is:

1. An operation input device for allowing an operator to input a movement instruction to an object to be controlled, comprising:
   a first movement detection unit for detecting the position of a first operation input unit which contacts and moves with movement of a first portion of an appendage of the operator, wherein the first movement detection unit has at least three degrees of freedom; and
   a second movement detection unit for detecting the position and attitude of a second operation input unit which contacts and moves with movement of a second portion of same appendage of the operator and which is connected via linkage to the first operation input unit, wherein the second movement detection unit has six degrees of freedom.

2. The operation input device of claim 1, wherein the first operation input unit and the second operation input unit are connected to the proximal end side of the device by a series of linkages so that the first movement detection unit is situated on the device proximal end side of the second movement detection unit; the first movement detection unit detects mainly the position of the first operation input unit; and the second movement detection unit detects the position of the second operation input unit relative to the first operation input unit and the attitude of the second operation input unit.

3. The operation input device of claim 1 or 2, wherein the first movement detection unit has degrees of freedom for detecting the position of the first operation input unit and degrees of freedom corresponding to a change in an attitude of the first operation input unit caused by a change in position; and the second movement detection unit has degrees of freedom for detecting the attitude of the second operation input unit and degrees of freedom corresponding to a change in the position of the second operation input unit caused by a change in attitude.

4. The operation input device of claim 1, wherein the first operation input unit has an armrest unit for supporting at least around the wrist of the arm of an operator; the first movement detection unit detects the position and attitude of a part corresponding to the wrist of the operator; the second operation input unit has a holding unit to be held by a finger of the operator; and the second movement detection unit detects the position and attitude of the holding unit.

5. The operation input device of claim 4, wherein the holding unit has a control lever, and the movement of the control lever can be detected.

6. The operation input device of claim 1, wherein the first movement detection unit and the first operation input unit achieve at least three degrees of freedom with respect to the proximal end of the device with the aid of hinges and linkages; and the second movement detection unit is connected to the device proximal end side of the first operation input unit of the first movement detection unit, and the second movement detection unit and the second operation input unit achieve six degrees of freedom with the aid of hinges and linkages.

7. The operation input device of claim 6, wherein the second movement detection unit has a position linkage unit for detecting the position of the second operation input unit and an attitude linkage unit for detecting the attitude of the second operation input unit, the position linkage unit connects two parallel linkages, and straight lines for connecting a pair of supporting points of the end portions of the parallel linkages are substantially at 45° from the vertical direction.

8. The operation input device of claim 6, wherein the position linkage unit comprises a dead weight compensation mechanism for urging the parallel linkages in the rotation direction by spring force.

9. The operation input device of claim 1, wherein the first movement detection unit has a first sensor configuration to afford the at least three degrees of freedom, and wherein the second movement detection unit has a second sensor configuration to afford the six degrees of freedom.

10. The operation input device of claim 9, wherein the first sensor configuration has a first plurality of sensors to afford the at least three degrees of freedom, and wherein the second sensor configuration has a second plurality of sensors to afford the six degrees of freedom.

11. The operation input device of claim 10, wherein the first sensor configuration has five sensors to afford the at least three degrees of freedom, and wherein the second sensor configuration has six sensors to afford the six degrees of freedom.

12. The operation input device of claim 1, wherein the at least three degrees of freedom and the six degrees of freedom are independently detectable, by the first movement detection unit and the second movement detection unit.

13. An operation input device for allowing an operator to input a movement instruction to an object to be controlled, comprising:

a first movement detection unit configured to detect, via a first plurality of sensor units, the position of a first operation input unit which contacts and moves with movement of a first portion of an appendage of the operator, wherein the first movement detection unit has at least three degrees of freedom;

a second movement detection unit configured to detect, via a second plurality of sensor units, the position and attitude of a second operation input unit which contacts and moves with movement of a second portion of same appendage of the operator and which is connected via linkage to the first operation input unit, wherein the second movement detection unit has six degrees of freedom;

a first calculating unit configured to receive outputs of only the first plurality of sensor units, and to extract only position information of a position of the first operation input unit responsive thereto; and, a second calculating unit configured to receive outputs of both the first plurality of sensor units and the second plurality of sensor units, and to extract only attitude information of an attitude of the second operation input unit, responsive thereto.

14. The operation input device of claim 13, wherein the first operation input unit has an armrest unit for supporting at least around the wrist of the arm of an operator; the first movement detection unit detects the position and attitude of a part corresponding to the wrist of the operator; the second operation input unit has a holding unit to be held by a finger of the operator; and the second movement detection unit detects the position and attitude of the holding unit.

15. The operation input device of claim 13, comprising:

a transmission instruction unit configured to forward an instruction to the object to be controlled, where the transmission instruction unit is configured to forward the instruction as containing both the position information of the position of the first operation input unit, and the attitude information of the second operation input unit, as the instruction.

* * * * *